United States Patent [19]
Asano et al.

[11] 3,765,520
[45] Oct. 16, 1973

[54] TRANSMISSION VALVE NEUTRALIZED BY BRAKE APPLICATION

[75] Inventors: Tadao Asano; Shin Kitano; Hiroji Yamaguchi; Yutaka Momose, all of Kariya, Japan

[73] Assignees: Aisin Seiki Kabushiki Kaisha; Toyoda Automatic Loom Works, Ltd., both of Kariya, Aichi Prefecture, Japan

[22] Filed: Oct. 6, 1969

[21] Appl. No.: 864,009

[52] U.S. Cl. ............... 192/4 A, 251/229, 251/243
[51] Int. Cl. .................................. B60k 29/02
[58] Field of Search ............ 251/229, 231, 243; 192/4 A, 4 B, 4 C

[56] References Cited
UNITED STATES PATENTS
3,702,648  11/1972  Mori ............................. 192/4 C
1,582,725  4/1926  Bethel et al. .................. 251/229 X
3,292,752  12/1966  Schuster et al. ............... 192/4 A X
3,349,860  10/1967  Ross ............................. 192/4 B X
3,480,120  11/1969  Lenzen et al. ................. 192/4 C Primary Examiner—Benjamin W. Wyche
Attorney—Wenderoth, Lind and Ponack

[57] ABSTRACT

A device for controlling a change-over valve comprises a first manually operable lever to place the change-over valve into a desired position through a second lever connected to the valve, and a third manually operable lever to force, only when actuated, the valve into neutral position through the second lever irrespective of the actuation of said first lever, said levers being adapted to allow the valve to return automatically to a forward or reverse drive position from said neutral position upon release of the third lever.

7 Claims, 7 Drawing Figures

TADAO ASANO, SHIN KITANO,
HIROJI YAMAGUCHI &
YUTAKA MOMOSE, INVENTORS

TRANSMISSION VALVE NEUTRALIZED BY BRAKE APPLICATION

This invention relates in general to a device for controlling a change-over valve, and particularly to a device for controlling a valve for rendering fluid actuated clutch means for use in an industrial vehicle operative or inoperative.

A primary object of this invention is to provide a change-over valve control device, wherein manually operable lever means are provided respectively to place the change-over valve in a desired position and to force, only when actuated, the valve into neutral position irrespective of the actuation of the former manually operable lever.

Another object of this invention is to provide a device for controlling a valve for rendering fluid actuated clutch means for use in an industrial vehicle operative or inoperative, wherein the change-over valve is adapted to be controlled in co-operation with a brake pedal so that it is possible to cut off or effect a transmission of power from an engine to a driving system without a provision of a special valve for shutoff of fluid flow through a fluid circuit.

A further object of this invention is to provide a control device which enables an industrial vehicle to inch forwardly or reversely by properly actuating the brake pedal associated with the control device.

These and further objects of the invention will become more readily apparent upon a reading of the description following hereinafter, and upon an examination of the drawings, in which.

Figure 1:
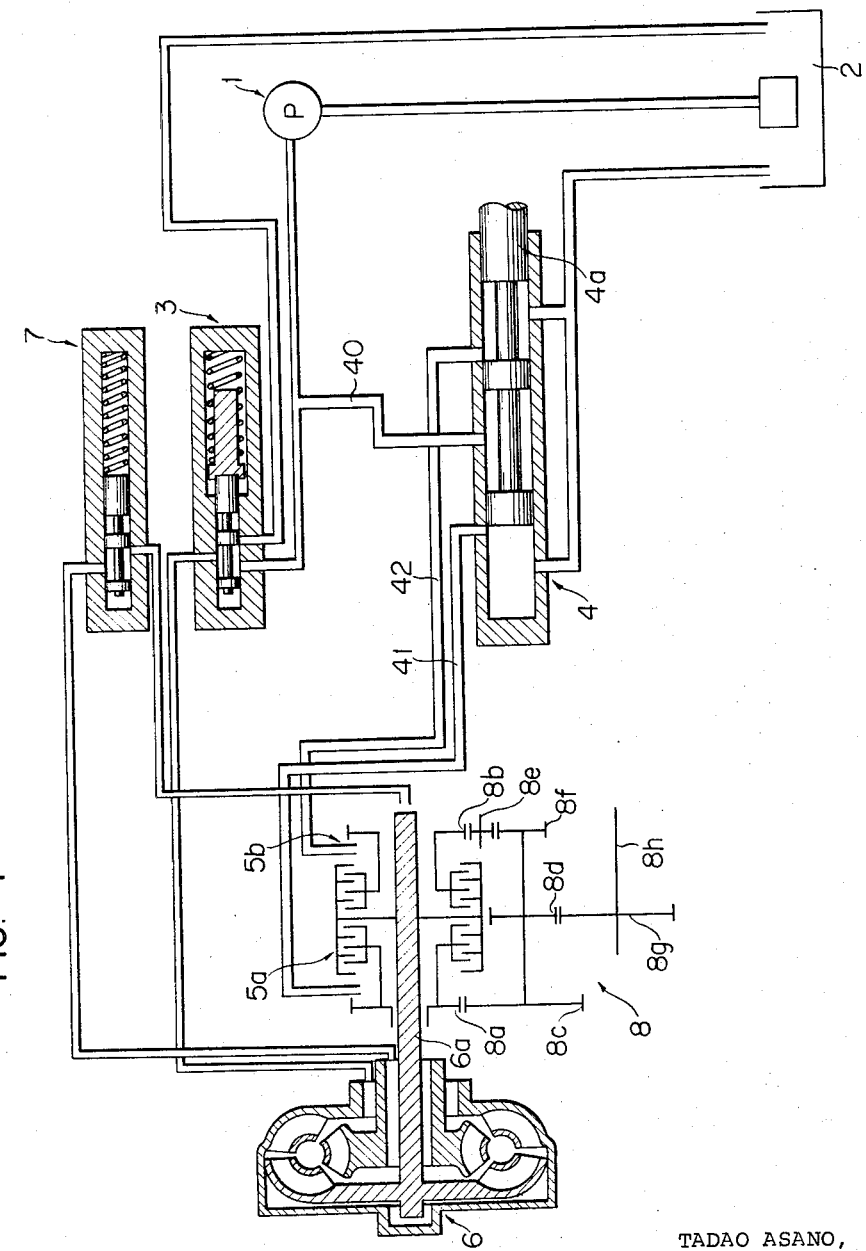
FIG. 1 is a diagrammatic showing of one embodiment of a transmission which is hydraulically controlled in a common manner.

Referring to the drawings and FIG.1 in particular, there is illustrated a transmission of the fluid control type. The numeral 1 designates an oil pump of a conventional form with which fluid, such as oil, within a sump tank 2 is pumped up, and fluid under pressure is fed from the pump 1 to a regulator valve 3 as well as a valve means 4 for changing-over the direction in which a vehicle moves. Said oil pump 1 is driven by a suitable engine, such as the vehicle engine (not shown). A valve member or spool 4a nested in a cylinder or valve housing is adapted to be selectively placed in any one of three positions, that is, a first or forward drive position, a second or reverse drive position, and a third or neutral position. As will be described in detail hereinafter, when the spool 4a is located in the first position, fluid under pressure from the pump 1 is directed through a fluid passageway 40 connected to an inlet port of the cylinder, and a fluid passageway 41 connected to one outlet port of the cylinder, to a first or forward drive fluid actuated clutch means 5a forming a portion of the transmission; when in the second position, fluid under pressure entering in the cylinder is directed through a fluid passageway 42 connected to another outlet port of the cylinder, to second or reverse drive clutch means 5b thereby to effect reverse drive; and when in the neutral position as shown in FIG. 1, fluid under pressure from the conduit 40 is prevented from flowing to said clutch means 5a and 5b due to interference by land portions of the valve spool 4a.

Said power transmission further comprises a gearing 8 which is of the one forward-one reverse type in this embodiment. Designated at 6 is a torque converter through which output power of the vehicle engine is transmitted to the gearing 8. The torque converter is of conventional construction and need not to be further described. Disposed above the regulator valve 3 in FIG. 1 is a relief valve 7 for regulating pressure exerted on circulating oil at the righthand end of the torque converter 6.

Figure 2:
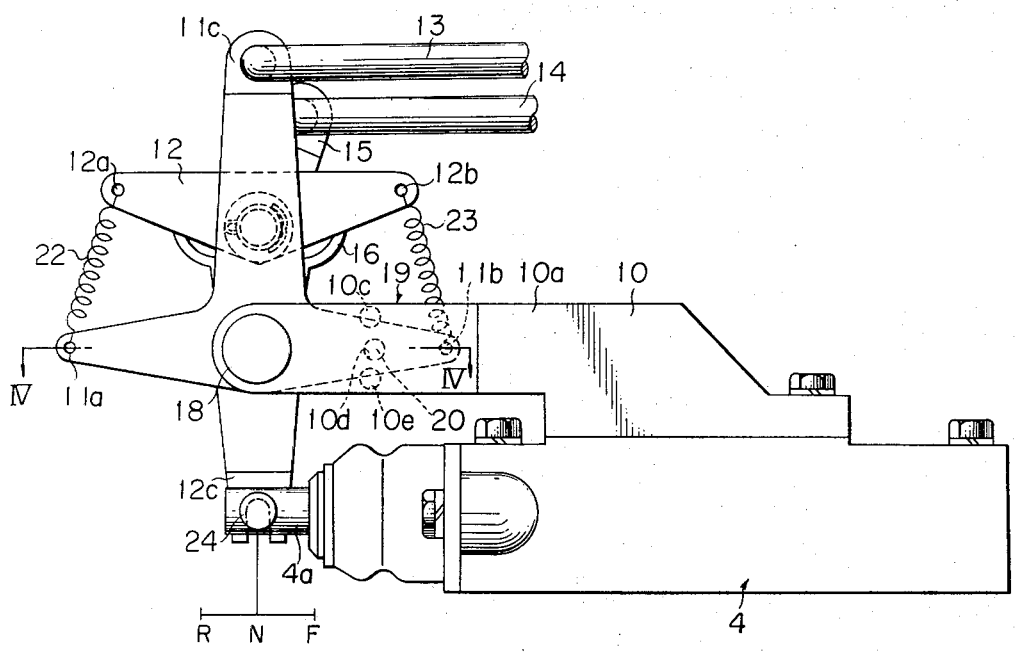
FIG. 2 is a side elevational view of an embodiment of a device according to the invention.
Figure 3:
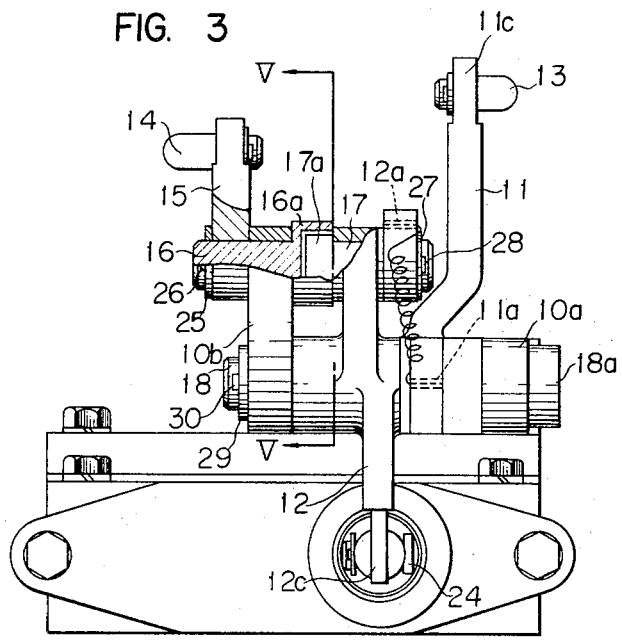
FIG. 3 is a front elevational view of the device in FIG. 2, shown partly in section.

FIGS. 2 to 5 show the control device of the present invention which is applicable to the abovementioned valve means 4 and operatively connected thereto. The device for controlling the change-over valve 4 comprises a mounting base 10 fixedly secured to the valve housing of the valve 4 by means of bolts as shown. The base 10 at its lefthand end is bifurcated as indicated in FIG. 3 for a purpose to be now described. Between arms 10a and 10b extending leftwardly from the bifurcated base 10, there are first and second levers 11 and 12, each pivotally connected to the base by a common pin 18 of which axial movement is prevented by cooperation amongst its protruding end or head 18a, a washer 29, a split pin 30 and said arms as best shown in FIG. 3. At the upper end portion 11c of the first lever 11, a link 13 is pivoted which connects the lever 11 to a manually operable shift lever (not shown). Said first and second levers 11 and 12 are connected through tension springs 22 and 23 to each other, the first spring 22 being stretched between lefthand holes 11a and 12a formed respectively in substantially horizontally leftwardly extending portions of the first and second levers 11 and 12, and the second spring 23 being similarly stretched between righthand holes 11b and 12b formed respectively in substantially horizontally rightwardly extending portions of the first and second levers 11 and 12. The second lever 12 at its lower end is forked as best shown in FIG. 2 to hold in its U-shaped notch a pin 24 connected to the valve spool 4a, thereby enabling upon rotation of the second lever 12 the valve spool 4a to be moved axially leftwardly or rightwardly into a desired position within the valve housing.

With respect to the arm 10b of the base 10, a cam 16 is loosely or turnably mounted thereto. At the leftwardly extending end portion (FIG. 3) of the cam 16, a third or cam lever 15 is fixedly secured, whereby rotational motion of the cam lever 15 can be transmitted to the cam 16. The cam 16 is prevented from axial movement by co-operation amongst a washer 25, a split pin 26, its enlarged end 16a and the arm 10b. At the upper end portion of said third lever 15 is pivoted a link 14 which is adapted to be co-operated with an actuating means, such as a brake pedal (not shown). As will be apparent from FIGS. 2 and 3, the second lever 12 at its upper mid portion is provided with a pin 17 as a cam follower, a head 17a of the pin 17 being housed within the enlarged end 16a of the cam 16 with a path. Rightward and a leftward axial movement of the pin 17 are restrained respectively by said head 17a, and by a washer 27 and a split pin 28.

A groove provided in the enlarged end 16a for the pin head 17a is shaped to cause the driven member, i.e., the pin 17 to be given a desired motion as will be described hereinafter. Namely, the groove is of such dimension as to effectively co-operate with the pin 17.

In the embodiment shown in FIGS. 2 to 5, the cam surface, i.e., the surface of the groove consists of two curved lines connected by a pair of circular arcs having the same radius of curvature.

Figure 4:
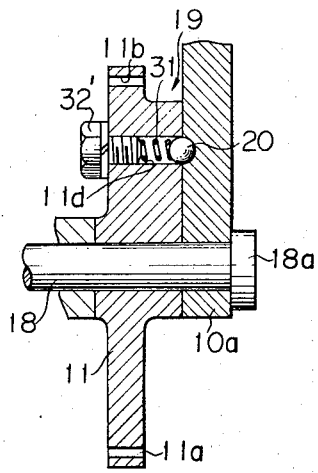
FIG. 4 is a fragmental section as viewed along line IV—IV of FIG. 2.

As clearly shown in FIGS. 2 and 4, at the horizontally extending portion of the first lever 11, a locking means 19 co-operating with the arm 10a of the base 10 is provided for selectively locking the lever 11 in a position corresponding to said forward drive, reverse drive, or neutral positions of the valve spool 4a. The locking means 19 comprises a bolt 32' screwed into a through hole 11d bored in the first lever 11, a convexed member or ball 20 partly housed in said hole 11d, and a resilient means, such as a spring 31, disposed between said bolt 32' and ball 20 to constantly push the ball 20 against the inner side of the arm 10a. The arm 10a provided in its inner side with three concaves 10c, 10d and 10e with which the ball 20 is selectively engageable upon oscillation of the first lever 11. It will be understood that the concaves are circumferentially spaced apart by intervals of such magnitude as correspond to the amounts of displacement of the valve spool when it is moved from the neutral position to the first and second positions.

The operation of the invention comprising the above construction will now be described.

In FIG. 1, pressurized fluid from the pump 1 is introduced into the change-over valve 4, with the pressure thereof being regulated into a substantially constant value by the regulator valve 3. When the valve spool 4a is moved axially leftwardly from the neutral position (as shown in FIG. 1) into the first position in such a manner as will be described hereinafter, the fluid passageway 40 is communicated with the fluid passageway 41. Thus fluid in the fluid passageway 41 acts on the clutch means 5a for the forward drive to urge the latter into clutching engagement, whereby an input gear 8a is selectively clutched to an output shaft 6a of the torque converter 6 for integral rotation. The rotational motion of the gear 8a due to the output shaft 6a is transmitted through a first intermediate gear 8c in meshing engagement with the gear 8a, a second intermediate gear 8d adapted to be rotated integrally with the second gear 8c, and an output gear 8g in meshing engagement with the gear 8d to an output shaft 8h and thence to driving wheels (not shown), thereby driving the vehicle in the forward direction.

When it is required to drive the vehicle in the reverse direction, the valve spool 4a is moved axially rightwardly and placed in the reverse drive position, whereupon the fluid passageway 40 is communicated with the fluid passageway 42. Thus, fluid in the fluid passageway 42 acts on the clutch means 5b for the reverse drive to urge the latter into clutching engagement, whereby a gear 8b is selectively clutched to the output shaft 6a of the torque converter 6 for integral rotation. The rotation of the gear 8b can be transmitted through a third intermediate gear 8e meshing with the gear 8b, a fourth intermediate gear 8f meshing with the gear 84, the second intermediate gear 8d adapted to be rotated integrally with said gear 8f, and the output gear 8g in meshing engagement with the gear 8d to the output shaft 8h and thence to the driving wheels of the vehicle. In this case, due to the presence of the third gear 8e betweeen the input gear 8b and the fourth gear 8f, the rotational direction of the output shaft 8h is reversed and therefore the vehicle is moved in the reverse direction.

Figure 5:
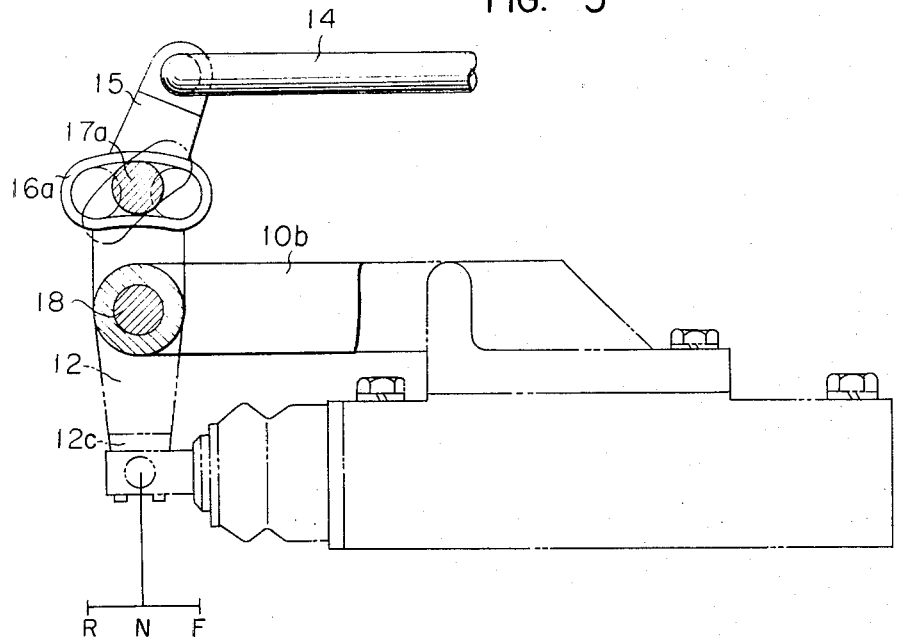
FIG. 5 is a fragmental section as viewed along line V—V of FIG. 3.

The shifting of the valve spool 4a from the neutral position to the first or the second positions thereof and vice versa is accomplished by operating the manually operable shifting means connected to the link 13 which is, in turn, pivotally connected to the valve spool 4a as described. In FIG. 2, when the first lever 11 is turned in the counter-clockwise direction through the link 13, the ball 20 of the locking means 19 provided in the lever 11 is brought into locking engagement with the concave 10c formed in the arm 10a of the base 10 to retain the first lever 11 in a position corresponding to the forward drive position of the valve spool 4a. At the same time, the second lever 12 and the pin 17 connected thereto are also turned in the counterclockwise direction by the same angle of turn because these levers 11 and 12 are connected to each other by the springs 22 and 23, so that the valve spool 4a operatively engaging with the second lever 12 at its lower end 12c is moved into the first or forward drive position. Under these circumstances, if the brake pedal is actuated to apply the braking motion, the link 14 co-operated with the brake pedal is moved in the leftward direction while at the same time the third lever 15 is turned in the counterclockwise direction, with the attendant turning of the cam 16a in the same direction as shown in FIG. 5 by dotted line. Consequently, the head 17a of the pin 17 is moved back in its neutral position as shown in FIG. 5 by the upper curved surface of the groove formed in the enlarged portion 16a. Due to engagement of the pin 17 with the second lever 12, the latter is also turned back in its neutral position against the action of the spring 23, resulting in the valve spool 4a being returned to the neutral position. The first lever 11 is, however, held in the forward drive position by the locking means 19, because the force exerted by the spring 31 of the locking means to push the ball 20 against the arm 10a is regulated in a magnitude sufficient to prevent turning of the first lever 11. It will therefore be understood that, if the brake pedal is released and the attendant axial movement of the link 14 in the rightward direction occurs, the second lever 12 as well as the valve spool 4a are returned to the respective first positions by the action of the spring 23.

In contradistinction to the above case, when the first lever 11 is turned in the clockwise direction, the ball 20 of the locking means 19 is brought into locking engagement with the concave 10e to retain the first lever 11 in a position corresponding to the second or reverse drive position of the valve spool 4a. Upon actuation of the brake pedal, the head 17a of the pin 17 in a position corresponding to the second position of the valve spool 4a is urged to its neutral position by the cam 16 at its lower surface of the groove formed in the enlarged portion 16a, whereby the second lever 12 is caused to move into its neutral position and the valve spool is in turn moved into the neutral position. When the brake pedal is released, the valve spool 4a is moved back to the reverse drive position to allow the vehicle to be driven in the reverse direction.

Figure 6:
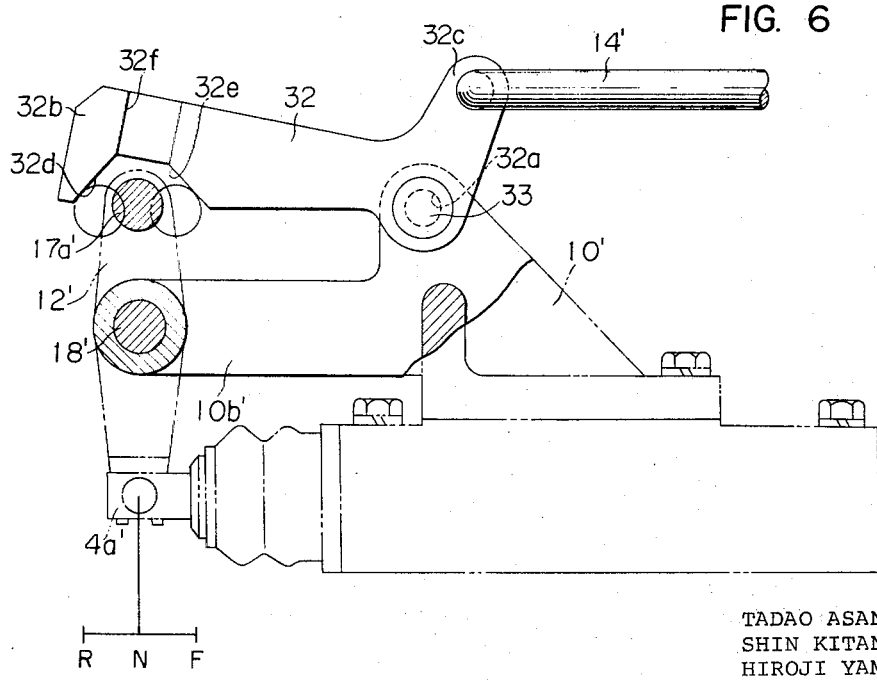
FIG. 6 is a view corresponding to FIG. 5, but showing a modified form of a cam lever.
Figure 7:
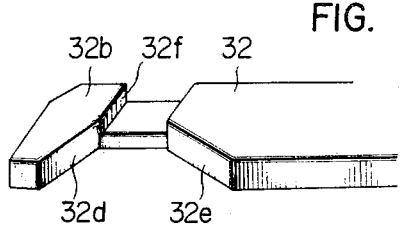
FIG. 7 is a perspective view showing essential parts of the cam lever in FIG. 6.

In FIGS. 6 and 7, a modified form of cam 32 is shown as being in the form of bell crank. The bell crank 32 at its fulcrum 32a is mounted for rotation on base 10' by a pin 33, the one end portion 32c of the bell crank having a link 14' pivotally connected thereto, and the other end portion being formed with a groove 32f having a channel section, and a recess cut in the form of a trapezoid as shown. The channel 32f is dimensioned for a head 17a' of a pin 17'. In the case of a second lever 12' being in a neutral position, the bell crank 32 is adapted to receive in its channel 32f the head 17a' of the pin 17' when turned in the counterclockwise direction. In the case of the second lever 12' and the pin 17' connected thereto being in a first or forward drive position (only one position of the pin 17' is shown by a dotted line in FIG. 6), upon actuation of the brake pedal the pin 17' will be moved back in the neutral position by the engagement of the head 17a' with a left cam surface 32d, so that the second lever 12' and in turn a valve spool 4a' are placed into the neutral position. In the case of the second lever 12' being in a second or reverse drive position, upon actuation of the brake pedal, the pin 17' will be moved back into the neutral position by the engagement of its head 17a' with a right cam surface 32e, with the result that the valve spool 4a' is placed into the neutral position.

From the foregoing it will be seen, according to the present invention, that the brake pedal is associated through the cam with the change-over valve forming a portion of the transmission, and the manually operable shifting means is associated through the spring means with the change-over valve so that the transmission may be changed-over to neutral upon actuation of the brake pedal even if the shifting means is not in its neutral position, and that when the brake pedal is released the valve may be moved back from the neutral position to the first or the second position. It will also be seen that no power is delivered through the transmission during the braking action so that any mechanism in the power transmitting system may be prevented from being overloaded, and that it is possible to inch the vehicle forwardly or rearwardly merely by suitably actuating the brake pedal.

While the invention has been illustrated and described with reference to the preferred embodiments thereof, it is to be understood that various changes in the details of constructions and the arrangement and combination of parts may be made without departing from the spirit and scope of the invention.

What we claim is:

1. A device for controlling a change-over valve having a valve housing and a valve spool selectively placed into one of forward, neutral and reverse positions, comprising
   a bifurcated base member having spaced arms and fixedly secured to said valve housing;
   support axis extending between said arms of said base member;
   a first manually operable lever pivotally supported by said support axis;
   a second lever similarly pivotally supported by said support axis, said second lever being provided with a bifurcated engaging portion engaging said valve spool;
   each of said first and second levers being provided with arms extending in opposite directions;
   a pair of spring means stretched between one pair of arms of said first and second levers and between the other pair of arms of said first and second levers, each arm pair extending in the same direction, said pair of spring means allowing said second lever to be turned about said support axis with said first lever when said first lever is manually turned, thereby to place said valve spool in a selected one of said three positions;
   locking means disposed between said first lever and said base member for locking said first lever therewith to prevent its being turned by said second lever;
   a third manually operable lever pivotally supported by said base member; and
   cam means fixedly secured to said third lever at one portion thereof and turnably mounted on said base member at another portion thereof, said cam means further being engaged with said second lever so as to operate said second lever according to the turn of the third lever.

2. A device for controlling a change-over valve having a valve housing, comprising a first manually operable lever pivotally connected to said valve housing,
   a second lever pivoted on said valve housing coaxially with said first lever, said second lever being provided with an engaging portion engaging said change-over valve,
   a pair of resilient transmitting means disposed, respectively, between said first and second levers for transmitting pivotal motion of the first lever to said second lever,
   means positioned between said first lever and said valve housing for locking said first lever with said valve housing to prevent its being turned by said second lever,
   a third lever turnable by manual operation, and
   cam means fixedly secured to said third lever at one portion and turnably mounted to said valve housing at another portion thereof, said cam means further being engaged with said second lever so as to operate said second lever according to the turn of said third lever, said cam means including a curvedly elongated groove having concentric cam surfaces with either of which a cam follower fixedly secured to said second lever is in contact engagement upon movement of said cam means, the radius of curvature of said groove being substantially equal to the radius of turn of said follower.

3. A device for controlling a change-over valve having a valve housing, comprising a support axis mounted to said valve housing,
   a first manually operable lever pivotally connected to said valve housing by said support axis,
   a second lever pivoted on said valve housing coaxially with said first lever by said support axis and having opposite ends, said second lever being provided at one of said ends thereof with an engaging portion engaging said change-over valve,
   a pair of resilient transmitting means disposed between said first and second levers at zones spaced radially in opposite directions from said support axis for transmitting pivotal motion of the first lever to said second lever,
   means positioned between said first lever and said valve housing for locking said first lever with said valve housing to prevent its being turned by said second lever, a third lever turntable by manual operation, and cam means fixedly secured to said third lever at one portion and turnably mounted to said valve housing at another portion thereof, and a cam follower fixedly secured to the other end of said second lever and engageable with said cam means so as to operate said change-over valve according to the turn of said third lever through said engaging portion of said second lever.

4. The device according to claim 3, wherein said pair of resilient transmitting means are springs.

5. The device according to claim 3, wherein said cam means comprises a channel-shaped groove, and a trapezoid-shaped groove having divergent cam surfaces with either of which said cam follower fixedly secured to the other of said ends of said second lever is in contact engagement upon movement of said cam means.

6. The device according to claim 3, wherein said change-over valve is adapted to control fluid actuated clutch means through which power from an engine is transmitted to the driving system of a vehicle, and is placed into one of three, forward drive, neutral and reverse drive positions by a manually operable shifting means operatively connected to said first lever thereby to cause clutching engagemnt and disengagement of said clutch means, and said third lever is associated with a brake pedal so that upon actuation of the brake pedal said cam means moves said second lever to a position in which said change-over valve is in neutral.

7. A device for controlling a change-over valve having a valve housing, comprising a support axis mounted to said valve housing, a first manually operable lever pivotably connected to said valve housing by said support axis, a second lever pivoted on said valve housing coaxially with said first lever by said support axis and having opposite ends, said second lever being provided at one of said ends thereof with an engaging portion engaging said change-over valve, each of said first and second levers being provided with arms extending in opposite directions, a pair of spring means stretched between one pair of arms of said first and second levers and between the other pair of arms of said first and second levers, each arm pair extending in the same direction, said pair of spring means allowing said second lever to be turned about said support axis with said first lever when said first lever is manually turned, means positioned between said first lever and said valve housing for locking said first lever with said valve housing to prevent its being turned by said second lever, a third lever turnable by manual operation, and cam means fixedly secured to said third lever at one portion thereof and turnably mounted to said valve housing at another portion, said cam means comprising a channel-shaped groove and a trapezoid-shaped groove having divergent cam surfaces, and a cam follower fixedly secured to the other end of said second lever, said cam follower being in contact engagement with either of said cam surfaces upon movement of said cam means so as to operate said second lever according to the turn of the third lever.

* * * * *